Jan. 20, 1970  K. L. REYNOLDS  3,490,504
FEEDING APPARATUS FOR POTATO SEED CUTTER
Filed July 20, 1967

Kenneth L. Reynolds
INVENTOR.

BY *Clarence A. O'Brien*
*and Harvey B. Jacobson*
Attorneys

3,490,504
Patented Jan. 20, 1970

3,490,504
FEEDING APPARATUS FOR POTATO SEED CUTTER
Kenneth L. Reynolds, 91A Lower Main,
Fort Fairfield, Maine 04742
Filed July 20, 1967, Ser. No. 654,851
Int. Cl. A01c 1/00
U.S. Cl. 146—72           8 Claims

ABSTRACT OF THE DISCLOSURE

A potato seed cutting and feeding apparatus characterized by a support base, power driven shafts on said base carrying wheel-like rotors preferably but not necessarily, made of tough but suitably responsive rubber or equivalent material. Each rotor comprises duplicate disk-type heads providing potato feeders. These feeders have encircling trough-like channels for temporary retentive reception of the potatoes and the channel walls have circumferentially spaced parallel gripping and feeding ribs which deliver each potato to the fixed slicing blade.

---

This invention relates to certain new and highly useful improvements in potato seed feeding and cutting apparatus and has to do, more particularly, with structurally and functionally novel wheel-type rotors which have the capability of handling, securely gripping, feeding and presenting the potatoes to the cutting blades for uniform slicing.

Persons conversant with the field of invention above set forth are well aware that machines and apparatus which function to sever and divide seed potatoes into segments and functionally grip, align and forcibly present whole potatoes to slicing or cutting blades are old and well known. In fact, it is common practice to use two or more power-driven wheels which are of equal diameter and turn in opposite directions at equal speed. For background information the reader should acquaint himself with the Patent to Wetzel 2,705,986 which shows coplanar vertically disposed gripping and feeding wheels with deflated pneumatic tires whose coacting segmental tread portion provide the desired upper and lower V-type crotches or pockets, the upper pocket for piloting and initiating the first handling step and the inverted V-crotch for the H-shaped or equivalent cutting blade means which brings about the slicing step.

Briefly, the invention herein revealed has to do with an apparatus which is broadly analogous to prior art apparatus in that it comprises a stationary support having a horizontal base, a plurality of shafts journaled for cooperative rotation on said base and powered and driven by a suitable prime mover. These shafts, similar to the Wetzel patent, are geared together for rotation in unison. Instead of using pneumatically tired wheels the therein improved arrangement comprises first and second potato handling and feeding rotors mounted on corresponding terminal end portions of the respective shafts beyond said base, said rotors being alike, oriented and disposed in a common vertical plane, being rotatable in opposite directions about th ehorizontal axes of said shafts and having corresponding segmental peripheral portions located adjacent each other above said shafts and providing an upper potato receiving and temporary V-like pocketing crotch and a diametrically opposite lower inverted V-like crotch below the shafts into which a fixed potato cutting blade projects, whereby the whole potato can be and is gripped between said segmental portions and is delivered and forcibly presented to the slicing edge of said blade, each rotor having a circumferential trough-like encircling channel and the respective channels when converging toward said upper crotch coacting by piloting seating, lodging and holding the potato against displacement as it strikes said slicing edge.

In carrying out the principles of the present invention each rotor, which will be described as wheel-like in keeping with prior art adaptations, is made of compressibly resilient material. The walls which circumscribe the respective channels are yieldingly and conformingly responsive to adapt themselves to potatoes of different sizes and shapes. It follows that the channels are possessed of accommodation capabilities which are needed for satisfactory cutting and unhampered slicing results. More particularly the walls of this endless trough-like channel in each rotor have transverse circumferentially spaced fin-like ribs which are so arranged and so spaced that they provide potato nesting pockets between the ribs. The ribs themselves provide anti-slipping and friction grips with the result that the potatoes are firmly nestled in the pockets and are fed with positive certainty from the intake crotch to the discharge crotch where they are sliced.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
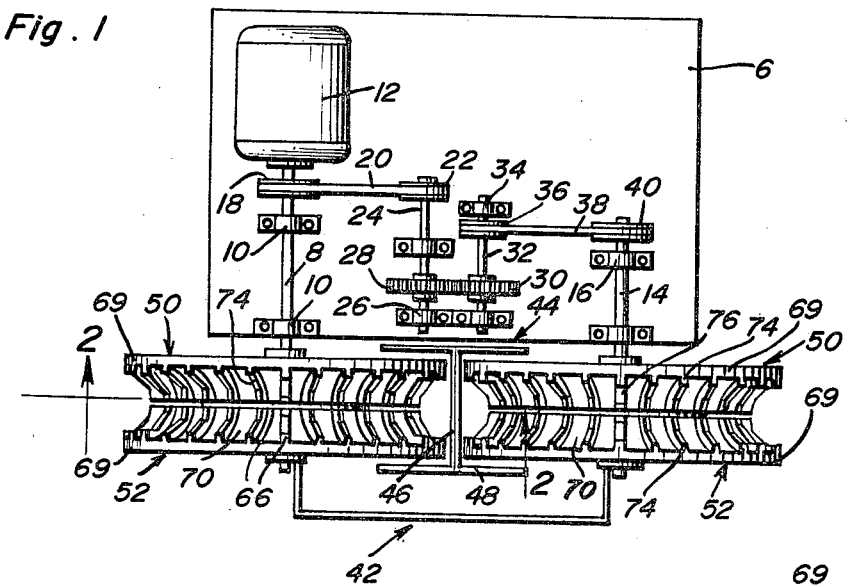
FIG. 1 is a top plan view of a seed potato handling and cutting apparatus having feeding wheels or rotors improved and constructed in accordance with the principles of the present invention.

By way of introduction to the description of the details it is to be pointed out that the support means, shaft means, and certain other component parts are shown for completeness of illustration of the over-all concept. To the ends desired, the support and shaft means is similar to that shown in the aforementioned Wetzel Patent 2,705,986. Briefly it comprises support means characterized by an appropriate horizontal base 6, a drive shaft 8 mounted in bearings 10 and driven by a prime mover, such as a motor or the like, 12. The companion driven shaft at the right in FIG. 1 is differentiated by the numeral 14, is journalled for rotation in bearings 16. A pulley or sheave 18 on shaft 8 drives a belt 20 which operates a complemental pulley 22 on an auxiliary shaft 24 journalled in bearings 26 and operating a gear 28 in mesh with a similar gear 30 on the second auxiliary shaft 32. The shaft 32 is suitably mounted in bearings 34 and has a pulley 36 operating a belt 38 which, in turn, operates the pulley 40 on the aforementioned shaft 14. The numeral 42 designates an appropriate container or receiver located below the H-shaped blade means 44. The blade means comprises component slicing blades 46 and 48. It will be clear therefore that the invention so far set forth in detail here is in and of itself old and that the essence of the present concept has to do with the wheel-like left and right rotors shown in FIG. 1 and mounted for rotation on the projecting shaft-ends and in opposed coplanar relationship to achieve the improved result desired. With the construction shown it will be evident as suggested in FIG. 2 that the wheels or rotors are keyed on the shafts and turned in opposite directions as indicated by the arrows A and B. The potato C is adapted to be delivered into the upper substantially V-shaped space or crotch D for delivery into the inverted V-shaped crotch C which accommodates the aforementioned blade 46.

Figure 3:
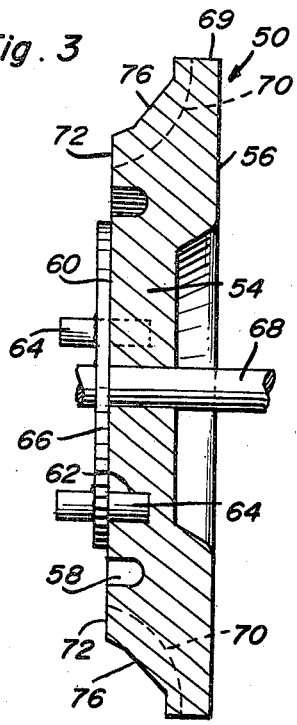
FIG. 3 is a view on an enlarged scale taken through one of the feeder heads or disks in the section line 3—3 of FIG. 2 and which shows in particular the manner in which the head is keyed to a mounting and rotating disk on the shaft.

Each rotor is made up of a pair of like feeding disks or heads. As a matter of fact the heads can be molded from tough but resilient and pliant rubber of an appropriate grade, it being understood that "rubber" is not a limitation. When the two heads are aligned in assembled side-by-side relationship as illustrated in FIG. 1 they define the complete potato pick-up handling and feeding rotor. Inasmuch as each head is the same in construction, it will be understood that the head or disk 50 is the same in construction as the companion or complemental disk 52. The example disk or head shown in FIG. 3 comprises a circular hub portion 54 which is joined to encircling annular component portion 56 by way of an endless groove 58. The flat surface 60 of the hub portion is provided with circumferentially spaced sockets 62 to accommodate appropriate keying lugs 64 on a coperating side of the attaching and keying flange 66 on that portion 68 of the shaft which carries it. In practice the disk is sandwiched between the two heads 50 and 52 in the manner shown in FIGURE 1 thus simultaneously driving the heads. The outer peripheral edge 69 cooperates with the endless concaved encircling inner surface 70 in defining a half-portion of the trough-like channel. Considering the half-portions conjointly it will be noted that the over-all channel is provided with a plurality of integral flexible and resilient fin-like ribs which function to pilot the potato into place and to grip it and feed it with positive forcible action to the cutting edge of the blade 46.

Figure 2:
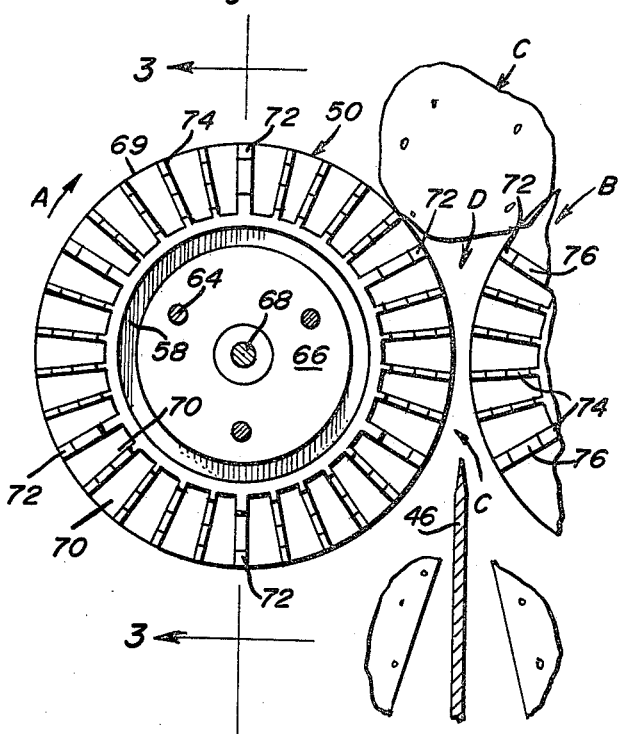
FIG. 2 is a fragmentary view taken approximately on the plane of the section line 2—2 of FIG. 1.

While all of the ribs are transverse, are in spaced parallel relationship and are often referred to as radial to the axial center it will be noted that they are in the order and relationship shown in FIG. 2. This is to say the channel wall which is provided with the ribs is equipped with six equidistant circumferentially spaced stout or main ribs 72 which define segmental spaces between themselves. Each individual segmental space is provided with thinner and more flexible ribs which are denoted at 74 and are designated as auxiliary ribs. It follows that the spacing between the various ribs functions to define intervening pockets which facilitate nesting the potato and also function to promote responsive flexibility for the ribs which insures that they fractionally engage the potato to feed it in the manner suggested in FIG. 2. These ribs, main and auxiliary, are provided with central notched portions 76 and practice has shown that they insure a better grip on the potato and that they function in a manner similar to anti-skid lugs, fins and the like which are in use on currently employed automobile tires. The flange or disk 66 with its lugs 64 fitting into keeper sockets 62 provides a novel mounting for the two heads which go to make up the over-all rotor. Although the heads are preferably made of tough moldable rubber they can be made of other equivalent yieldable and deformable material. The relatively large adapter flanges 66 serve to securely mount the heads or feeding disks in the manner illustrated in FIG. 3. The contouring of the half portions 70 (which cooperatively make up the trough-like channel) and even the junctional groove 58 between the component hub portion 54 and annular body portion 56 contribute to the production of a two-part feeding rotor which well serves the purposes for which it has been devised and successfully used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for progressively handling, feeding, and cutting seed potatoes comprising, in combination, stationary support means embodying a horizontal base, a pair of complemental spaced parallel shafts mounted for rotation in a common plane atop said base, means providing an operating connection between said shafts, a prime mover mounted on said base and simultaneously driving said shafts, first and second potato handling and feeding rotors mounted on corresponding terminal end portions of the respective shafts beyond said base, said rotors being alike, oriented and disposed in a common vertical plane, being rotatable in opposte directions about the horizontal axes of said shafts and having corresponding segmental peripheral portions, located adjacent each other above said shafts and providing an upper potato receiving and temporary V-like pocketing crotch and a diametrically opposite lower inverted V-like crotch below the shafts into which a fixed potato cutting blade projects, whereby the whole potato can be and is gripped between said segmental portions and is delivered and forcibly presented to the slicing edge of said blade, each rotor having a circumferential trough-like encircling channel and the respective channels when converging toward said upper crotch coacting by piloting seating, lodging and holding the potato against displacement as it strikes said slicing edge, each rotor being wheel-like and made of compressibly resilient material, the walls circumscribing their respective channels being yieldingly and conforming responsive and adaptable to potatoes of differing shape and sizes, said channels being possessed of the inherent accommodation capabilities needed for keen cutting and unhampered slicing results, the channel of each rotor being provided with transverse circumferentially spaced ribs providing potato nesting pockets, said ribs also providing anti-slipping friction grips, said ribs being radial to the axial center of rotation of said rotor and being yieldingly flexible and capable of gripping each potato with requisite certainty, said ribs embodying a plurality of equidistant circumferentially spaced relatively firm heavy duty main ribs and complemental smaller comparatively pliant auxiliary ribs arranged in groups between the main ribs.

2. The apparatus defined in and according to claim 1, and wherein all of said ribs are straight from end to end, are spaced apart in parallel relationship, the median lengthwise edge portion of each rib having a notch therein.

3. The apparatus defined in and according to claim 2, and wherein each rotor comprises a pair of duplicate discoidal heads made of moldable material and having opposed axial hub portions arranged face to face and secured to an attaching and assembling flange fixed on the coacting shaft.

4. In a seed potato feeding and cutting apparatus of the class described, a support base, a power driven shaft mounted for rotation on said base, said shaft having a rotor mounting and retaining flange fixed thereon, said flange being provided on opposite sides with outstanding circumferentially spaced rotor keying studs, a potato handling and feeding rotor comprising a pair of duplicate companion disk-type heads each made of moldable compressibly resilient material, said heads embodying circular hub portions having axial bearing holes surrounding the shaft and annular rim portions encircling the hub portions, said hub portions having flat faces abutting oriented faces of said flange, said flange being sandwiched between said faces and also having sockets into which said studs are fitted and telescopingly keyed, the opposed inner faces of said annular rim portions having endless circumferential concave channel-portions which coordinate in defining an encircling trough-like potato receiving and nesting channel.

5. The apparatus defined in and according to claim 4, and wherein the potato receiving channel of each rotor is, provided with transverse circumferentially spaced ribs which provide potato nesting pockets between themselves, said ribs providing anti-slipping friction grips, said ribs being radial to the axial center of rotation of said rotor and also being flexible and yieldingly deformable to the pressure imposed thereon when a potato is grippingly squeezed and removably held between the active ribs.

6. The apparatus defined in and according to claim 5, and wherein said ribs are characterized by a plurality of equidistant circumferentially spaced relatively firm heavy duty main ribs and complemental smaller comparatively pliant auxiliary ribs which are arranged in groups between the main ribs, all of said ribs being straight from end to end, spaced apart in parallel relationship and the median lengthwise edge portion of each rib having a notch formed therein.

7. The apparatus defined in and according to claim 4, and wherein said flange is of a diameter approximately the same as the diameter of the hub portions coacting therewith, the portions of the opposed inner surfaces of the rim portions of the heads contacting contiguous surfaces of said flange and immediately surrounding the outer marginal edge of said flange having opposed registering endless grooves therein.

8. The apparatus defined in and according to claim 7, and wherein the potato receiving channel of each rotor is, provided with transverse circumferentially spaced ribs which provide potato nesting pockets between themselves, said ribs providing anti-slipping friction grips, said ribs being radial to the axial center of rotation of said rotor and also being flexible and yieldingly deformable to the pressure imposed thereon when a potato is grippingly squeezed and removably held between the active ribs.

References Cited

UNITED STATES PATENTS

| | | | |
|---|---|---|---|
| 2,705,986 | 4/1955 | Wetzel | 146—59 X |
| 2,745,453 | 5/1956 | Perrell et al. | 146—72 X |

JAMES M. MEISTER, Primary Examiner

U.S. Cl. X.R.

146—167